United States Patent
Yoon

(10) Patent No.: US 11,378,969 B2
(45) Date of Patent: Jul. 5, 2022

(54) SYSTEM, METHOD, INFRASTRUCTURE FACILITY, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Sung Won Yoon, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 273 days.

(21) Appl. No.: 16/712,626

(22) Filed: Dec. 12, 2019

(65) Prior Publication Data
US 2020/0209877 A1    Jul. 2, 2020

(30) Foreign Application Priority Data
Dec. 28, 2018    (KR) .......................... 10-2018-0172545

(51) Int. Cl.
*G05D 1/00* (2006.01)
*G05D 1/02* (2020.01)

(52) U.S. Cl.
CPC ......... *G05D 1/0225* (2013.01); *G05D 1/0088* (2013.01); *G05D 1/0251* (2013.01); *G05D 1/0285* (2013.01); *G05D 2201/0212* (2013.01)

(58) Field of Classification Search
CPC .. G05D 1/0225; G05D 1/0088; G05D 1/0251; G05D 1/0285; G05D 2201/0212
See application file for complete search history.

(56) References Cited

U.S. PATENT DOCUMENTS

| | | | |
|---|---|---|---|
| 2016/0349753 A1* | 12/2016 | Tojima | G05D 1/027 |
| 2017/0297625 A1* | 10/2017 | Irion | G08G 1/148 |
| 2017/0351267 A1* | 12/2017 | Mielenz | G05D 1/0289 |

FOREIGN PATENT DOCUMENTS

| | | |
|---|---|---|
| DE | 102015201204 A1 | 7/2016 |
| JP | 2014034251 A | 2/2014 |

OTHER PUBLICATIONS

European Search Report for European Application No. EP19217426 dated May 27, 2020 (9 pgs).

\* cited by examiner

*Primary Examiner* — James M McPherson
(74) *Attorney, Agent, or Firm* — Fox Rothschild LLP

(57) ABSTRACT

An automated valet parking method is provided. The method includes initiating an automated valet parking, transmitting a target position and a guide route from an infrastructure facility to a vehicle, performing an autonomous driving to the target position along the guide route, measuring a vehicle position, calculating accuracy of the measured vehicle position, performing an autonomous parking to the target position.

18 Claims, 11 Drawing Sheets

| Step | Infra | Vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user)<br>• Transmit automated driving start instruction to vehicle | • Perform engine ON/OFF or pause ON/OFF according to the instruction of infra<br>• Lock the vehicle according to the instruction of infra |
| <2> DETERMINATION OF TARGET POSITION AND GUIDE ROUTE | • Determine the target position, guide route, and permissive driving area, and deliver these information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicles and obstacles (TBD) and monitor safety driving and parking operation of each vehicle (supervise) | • Estimate its own position<br>• Inform the infra of its estimated position / with the accuracy and frequency specified below (TBD)<br>• Inform the infra of its own status<br>• Detect the following obstacles (TBD) |
| <5> AUTONOMOUS PARKING | | • Park and stop the vehicle at the target position designated by infra (equivalent to PAPS parking requirements) |

Fig. 4A

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop, if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s² and stop, when the following conditions are met (1) vehicle received an instruction from infra for E/S (2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g., part failure, human or animal remaining inside the vehicle, etc.)<br>• Perform emergency stop when above fault is detected<br>• After coming to a stop, the vehicle shall remain stopped until it receives an instruction from infra to resume automated driving |

Fig. 4B

| DATA | Contents | Transmit (T)/ Receive (R) | | Regularly(R)/ Event(E) Transmission | Note |
|---|---|---|---|---|---|
| | | Infrastructure | Vehicle | | |
| (1) Vehicle qualification information | ID number (VIN) to identify each vehicle | R | T | — | |
| (2) Automated driving pr eparation instruction | — | T | R | When entering the parking | |
| (3) Vehicle information n otification | Vehicle state (normal stop/ driving/emergency stop, et c.)/Vehicle position (if could) | R | T | Right before automated dri ving start | This is also used for comm unication fault check by th e vehicle |
| (4) Vehicle information re sponse | — | R | T | R (1 Hz) | |
| (5) Target position · guid e route Delivery | Target position · Passing p oint location/Permitted tim e to pass through the poin t/Maximum speed | T | R | R (1 Hz) | |
| (6) Driving boundaries de livery | A group of lines to surrou nd the permitted driving ar ea | T | R | — | |
| (7) Automated driving sta rt instruction | — | T | R | After automated driving pr eparation instruction | |
| (8) Emergency stop instru ction | — | T | R | After delivery of guide rout e and driving boundaries, when restarting after emer gency stop | |
| (9) Vehicle control releas e instruction | — | T | R | — | |

Fig. 5

SYSTEM, METHOD, INFRASTRUCTURE FACILITY, AND VEHICLE FOR AUTOMATED VALET PARKING

CROSS-REFERENCE TO RELATED APPLICATION

The present application claims priority to and the benefit of Korean Patent Application No. 10-2018-0172545, filed Dec. 28, 2018, which is incorporated herein by this reference in its entirety.

TECHNICAL FIELD

The present disclosure relates to a system, method, infrastructure, and vehicle for supporting automated valet parking. More particularly, the present disclosure relates to an automated parking system that transports a vehicle to a vacant parking slot, without intervention of a driver seated in the vehicle, on the basis of communication between the vehicle and an automated parking facility (hereinafter, referred to as infrastructure facility).

BACKGROUND

The statements in this section merely provide background information related to the present disclosure and may not constitute prior art.

Modern cities suffer from various problems associated with car parking. For example, there is a risk of a car collision in a parking lot. In addition, for parking in crowded places such as large shopping centers, it takes long time and much energy to park a car due to traffic congestion even before entering a parking lot. In addition, it takes long time and much energy to locate a vacant parking slot even after entering the parking lot. In addition, there is inconvenience that a driver has to walk to a spot at which his or her vehicle is parked when leaving the visited area.

On the other hand, recent parking facilities and vehicles have a high-tech feature of obtaining position information of the vehicles. However, there is a risk of error in the obtained position information.

SUMMARY

The present disclosure provides an automated valet parking system and method in which a vehicle self-measures a position thereof, an infrastructure facility measures a position of the vehicle, an error of the vehicle position measured by the vehicle is compared with an error of the vehicle position measured by the infrastructure facility, and the vehicle performs autonomous parking on the basis of the measured vehicle position with less error.

In one form of the present disclosure, an automated valet parking method may include: initiating an automated valet parking procedure; transmitting a target position and a guide route from an infrastructure facility to a vehicle; performing, by the vehicle, autonomous driving to the target position along the guide route; measuring a position of the vehicle; calculating accuracy of the vehicle position measured; performing, by the vehicle, autonomous parking to the target position; and ending the automated valet parking procedure.

In another form of the present disclosure, a method of operating a vehicle for an automated valet parking may include: initiating an automated valet parking procedure; receiving a target position and a guide route from an infrastructure facility, performing autonomous driving toward the target position along the guide route, measuring a first vehicle position of the vehicle, calculating accuracy of the first vehicle position, performing autonomous parking to the target position and ending the automated valet parking procedure.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A and 4B are diagrams illustrating an automated valet parking procedure that performed by an infrastructure facility for automated valet parking and a vehicle in one form of the present disclosure;

FIG. 5 is a diagram illustrating a communication process performed between an infrastructure facility for automated valet parking and a vehicle in one form of the present disclosure;

Figure 1:
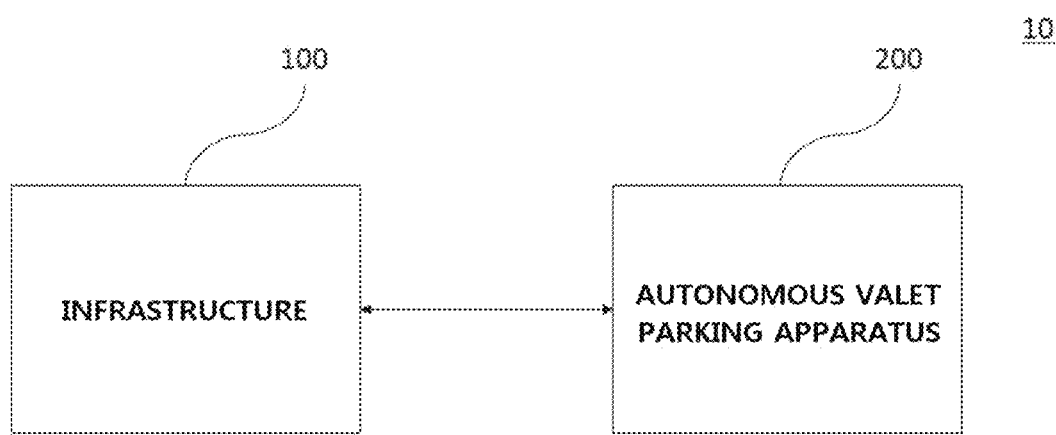
FIG. 1 is a block diagram illustrating an automated valet parking system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It is also noted that terms used in the detailed description of the disclosure are defined below.

The term "driver" refers to a person who uses a vehicle that is to be valet-parked by an automated valet parking system.

The term "driving authority" refers to the authority to drive and control a vehicle. The term "vehicle operation"

refers to an operation such as steering, acceleration, braking, gear shifting, vehicle starting, and door locking and unlocking of a vehicle.

The term "vehicle" refers to a vehicle having an autonomous valet parking feature.

The term "electric vehicle" refers to a vehicle that is driven by an electric motor that can be recharged in a cable plugging manner or a wireless charging manner.

The term "control center" refers to a facility that can monitor vehicles parked in a parking lot. The control center can determine a target position, a guide route, and a permitted driving area and transmit a driving start command or an emergency stop command to a vehicle.

The term "infrastructure facility" refers to a parking facility and include sensors installed in the parking facility. Alternatively, the term "infrastructure facility" refers to a control center that controls parking-site gates, vehicles, etc.

The term "target position" refers to a vacant parking slot available for parking. Alternatively, the term "target position" refers to a pickup area where a driver gets in his or her vehicle in a situation when the driver wants to leave the parking lot. Alternatively, the "target position" refers to a wireless-rechargeable parking slot equipped with a wireless charging system for wirelessly recharging a power source of a vehicle. For example, the target position may be a parking slot in which an electromagnetic induction coil is buried under the ground or is installed on the ground within the parking slot.

The term "guide route" refers to a path along which a vehicle can travel to reach a target position. For example, at the time of parking a vehicle, the guide route is a route extending from a drop-off point to a vacant area. For example, the guide route is provided in the form of instructions, for example, expressed as "driving straight ahead 50 m and turning left at the corner". Alternatively, the guide route is a route extending from a drop-off point to a wireless-rechargeable parking slot.

The term "driving route" refers to a path along which a vehicle can run.

The term "permitted driving area" refers to an area where driving of a vehicle is allowed. For example, the permitted driving area includes the driving route. The permitted driving area is defined with barrier walls, parked vehicles, parking lines, etc.

FIG. 1 is a block diagram illustrating an automated valet parking system in some forms of the present disclosure. Referring to FIG. 1, an automated valet parking system 10 includes an infrastructure facility 100 and an autonomous valet parking apparatus 200.

The infrastructure facility 100 refers to an apparatus or system that operates, manages, and controls an automated valet parking system. For example, the infrastructure facility 100 may be a parking facility. In some forms of the present disclosure, the infrastructure facility 100 includes sensors, communication devices, alarming devices, display devices, and a server device that controls those devices. Alternatively, the infrastructure facility refers to a control center that controls a parking lot gate, vehicles in a parking lot, etc.

The infrastructure facility 100 may include a communication circuit configured to perform a communication and a processor configured to determine or operate. In some forms of the present disclosure, the infrastructure facility 100 may further includes a sensor configured to sense or monitor the infrastructure facility 100. The operations or determination performed by the infrastructure facility 100 may be performed by the processor included in the infrastructure facility 100.

The autonomous valet parking apparatus 200 means a vehicle that can perform autonomous valet parking. In some forms of the present disclosure, the autonomous valet parking apparatus 200 means a component or a set of components capable of performing autonomous valet parking.

Figure 2:
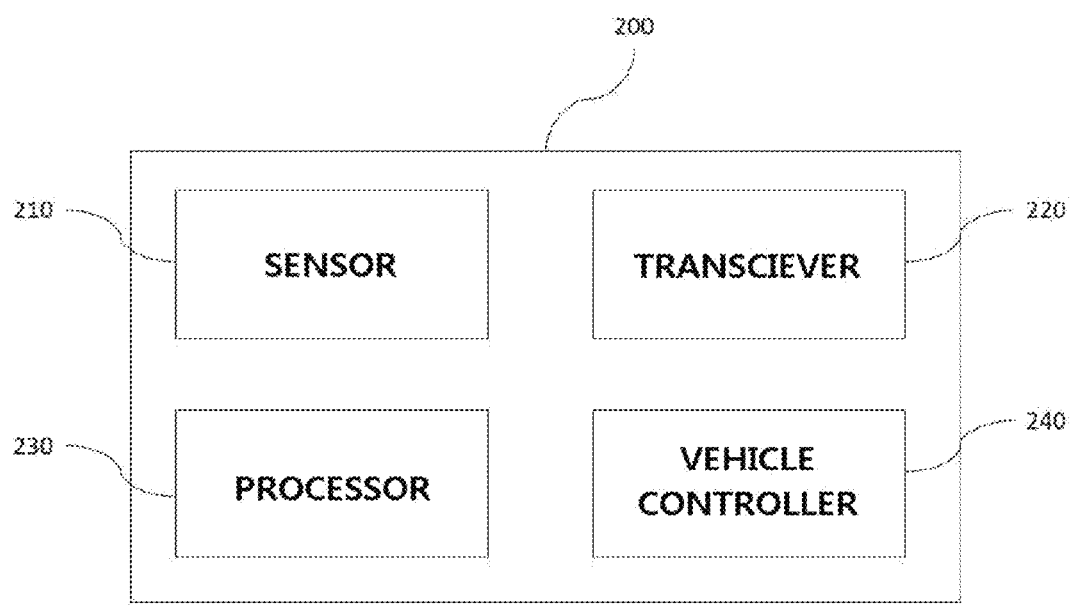
FIG. 2 is a block diagram illustrating an autonomous valet parking apparatus in one form of the present disclosure.

FIG. 2 is a block diagram illustrating an autonomous valet parking apparatus in some forms of the present disclosure. Referring to FIG. 2, the autonomous valet parking apparatus 200 (i.e., vehicle) includes a sensor 210, a transceiver 220, a processor 230, and a vehicle controller 240.

The sensor 210 senses parameters of a surrounding environment of the autonomous valet parking apparatus 200. In some forms of the present disclosure, the sensor 210 measures the distance between the autonomous valet parking apparatus 200 and a specific object or detects objects around the autonomous valet parking apparatus 200. For example, the sensor 210 includes at least one-type of sensor among an ultrasonic sensor, a radar sensor, a lidar sensor, a camera, an infrared sensor, a thermal sensor, a millimeter wave sensor, and a GPS receiver.

The sensor 210 transmits data that are results of detection by the sensor 210 to the transceiver 220 or the vehicle controller 240.

The transceiver 220 communicates the data with the infrastructure facility 100. This communication is called "vehicle to infra (V2I)" communication. The transceiver 220 communicates the data with other vehicles. This communication is called "vehicle-to-vehicle (V2V)" communication. The V2I communication and the V2V communication are collectively called "vehicle-to-everything (V2X)" communication. In some forms of the present disclosure, the transceiver 220 receives the data (for example, a target position, a guide rote, a driving route, a command, etc.) from the infrastructure facility 100, processes the received data, and transmits the processed data to the processor 230. The transceiver 220 transmits data collected by the vehicle 220 to the infrastructure facility 100. In some forms of the present disclosure, the transceiver 220 communicates the data with the mobile terminal of the driver of the vehicle 200.

The transceiver 220 receives and transmits the data according to a wireless communication protocol or a cable communication protocol. Examples of the wireless communication protocol include, but not limited to, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but are not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The processor 230 controls the overall operation of the vehicle 200. The processor 230 controls the vehicle controller 240 on the basis of the data transmitted from the sensor 210 and from the transceiver 220. In some forms of the present disclosure, the processor 230 generates a control signal for controlling the vehicle controller 240 on the basis of the data transmitted from the infrastructure facility 100 and then transmits the control signal to the vehicle controller 240.

That is, the processor 230 refers to a device that performs a series of calculations or makes a series of determination to control the vehicle 200 and to perform autonomous valet parking. For example, the processor 230 is a processor that operates according to a computer program including instructions for performing autonomous valet parking.

The processor may include a central processing unit (CPU), a micro controller unit (MCU), an application specific integrated circuit (ASIC), a field programmable gate array (FPGA) or a graphic processing unit (GPU), but not limited thereto.

The vehicle controller 240 controls the vehicle 200 according to the determination made by the processor 230. In some forms of the present disclosure, the vehicle controller 240 controls the vehicle 200 according to the control signal transmitted from the processor 230. For example, the vehicle controller 240 controls various vehicle operations such as driving, stopping, resuming of driving, steering, acceleration, deceleration, lighting of lamps, alarm sounding, etc.

That is, the vehicle controller 240 functions to control all kinds of operations of the vehicle 200 described herein. For example, the vehicle controller 240 may include a driving device, a braking device, a steering device, an accelerating device, a warning device and a lighting device.

On the other hand, although not described herein, the operations and/or functions of the vehicle 200 described in the description herein are performed by the conjunction of one or more components selected from among the sensor 210, the transceiver 220, the processor 230, and the vehicle controller 240.

Figure 3:
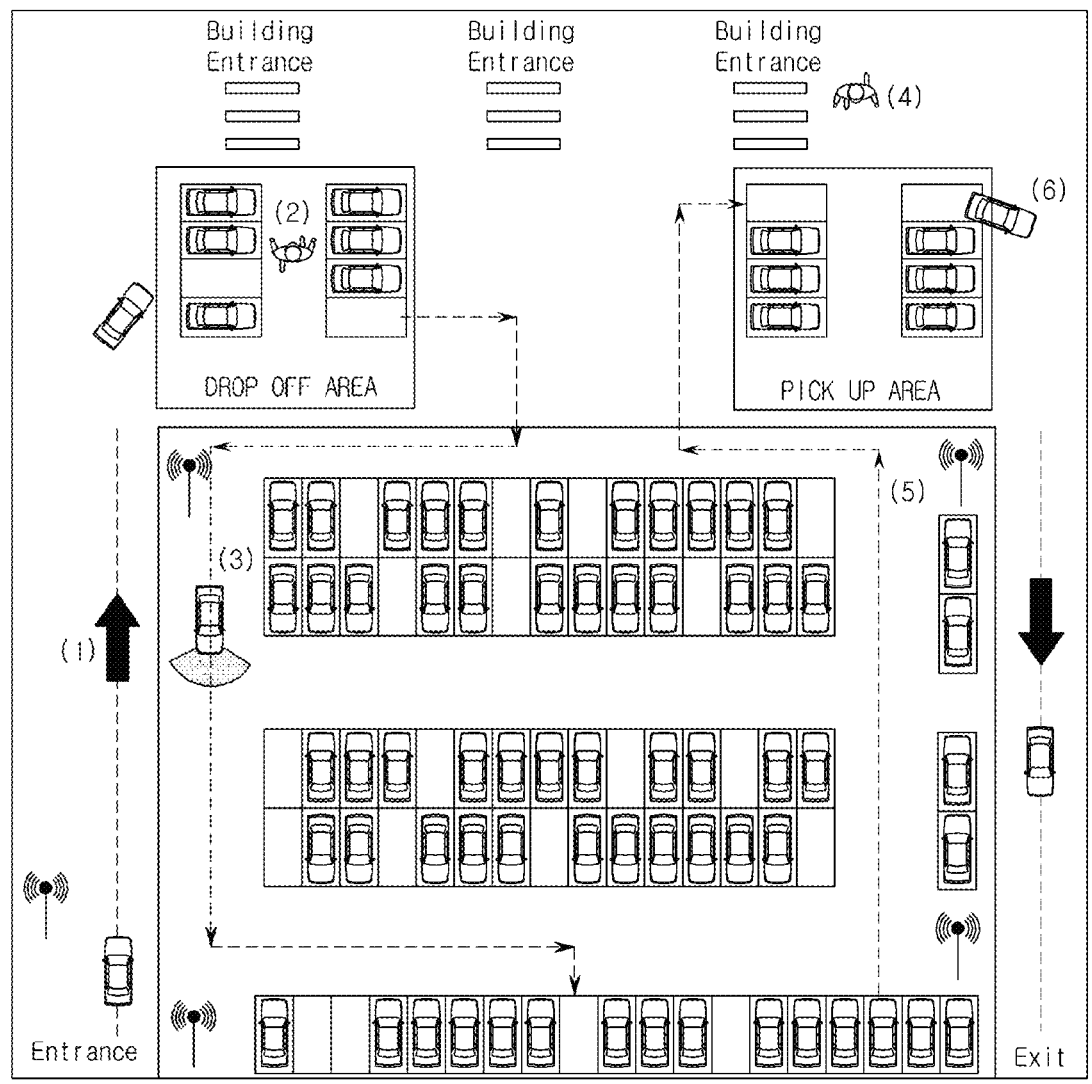
FIG. 3 is a conceptual view illustrating an automated valet parking system and method in one form of the present disclosure.

FIG. 3 is a conceptual view illustrating an automated valet parking system and an automated valet parking method in some forms of the present disclosure. Referring to FIG. 3, in step (1), a driver drives a vehicle to a drop-off area at which the driver will exit the vehicle after passing through the entrance of a parking lot.

In step (2), the driver exits the vehicle at the drop-off area and the authority to drive or control the vehicle is delegated to the infrastructure facility.

In step (3), the infrastructure facility searches for a vacant parking slot and assigns a suitable vacant parking slot to the vehicle. The infrastructure facility determines a guide route leading to the assigned vacant parking slot. After the parking slot and the guide route are determined, the vehicle autonomously travels along the guide route to reach the parking slot and performs autonomous parking to the parking slot.

In step (4), the driver claims his or her vehicle parked in the parking lot and walks to a pickup area where the vehicle can be returned to the driver.

In step (5), the infrastructure facility determines a suitable target position. For example, the suitable target position may be a vacant parking slot of multiple parking slots within the pickup area. The infrastructure facility determines a guide route which can lead the claimed vehicle to the target position. After the target position and the guide route are determined and transmitted to the vehicle, the vehicle autonomously travels along the guide route to reach the target position and performs autonomous parking.

In step (6), the driver arrives at the pickup area and takes over the authority to drive the vehicle. The driver drives the vehicle toward the exit of the parking lot.

FIGS. 4A and 4B are block diagrams illustrating operations performed during an automated valet parking procedure performed by an infrastructure facility and a vehicle.

In step (1), a preparation process in which an infrastructure facility and a vehicle prepare for automated valet parking is performed. The infrastructure facility identifies the driver and the vehicle and determines whether the driver and the vehicle are qualified to enter the parking lot. For example, the infrastructure facility determines whether the driver is a qualified driver by reading an identification number (ID) or a password input by the driver. In addition, the infrastructure facility determines whether the vehicle is a qualified vehicle by reading to an identification number of the vehicle. The vehicle can turn on and off the engine thereof by itself. The vehicle can turn on and off a power supply by itself. For example, a state in which the engine of the vehicle is turned off and the power supply is on is referred to as an accessary-on (ACC-On) state. The engine on/off and the power on/off of the vehicle are performed according to commands transmitted from the infrastructure facility or automatically performed without depending on the commands from the infrastructure facility. The vehicle can lock/unlock the door by itself. The locking/unlocking of a vehicle door is performed according to commands transmitted from the infrastructure facility or is autonomously performed by the vehicle without depending on the commands from the infrastructure facility. When the vehicle proceeds to an autonomous parking step, it is preferable to lock the vehicle door. In addition, the driving authority of the vehicle is delegated to the infrastructure facility. The driving authority means an authority to drive and control the vehicle. The vehicle operations include steering, accelerating, braking, gear shifting, engine starting/stopping, and locking/unlocking of a vehicle door. Since the driving authority of the vehicle is delegated to the infrastructure facility, the infrastructure facility can take complete control of the vehicle during the automated valet parking of the vehicle. Accordingly, it is possible to lower the possibility that an unintended operation of the vehicle occurs and to prevent vehicle accidents in the parking lot. However, in some cases, the authority to drive and control the vehicle may be partially delegated to the infrastructure facility, or the authority may be shared by the vehicle and the infrastructure facility. For example, a braking operation can be performed when an emergency occurs during the autonomous valet parking. Therefore, it is preferable for the vehicle to apply a brake without intervention of the infrastructure facility when the vehicle senses a danger with help of an ADAS sensor. In addition, the vehicle checks whether a person or animal is present in the vehicle. Since a parking duration from the completion of the autonomous valet parking to the discharging of the vehicle from a parking lot is likely to be long, if a person or animal accidently remains in the vehicle while the vehicle is parked, the person or animal would be in danger. Therefore, it is important to ensure that the vehicle is empty before the vehicle is autonomously parked. Whether a person or animal is present in the vehicle can be determined with a sensor mounted in the vehicle.

In step (2), a process of determining a target position, a guide route, and a driving route is performed. The determination of the target position, the guide route, and the driving route is performed by the infrastructure facility. The target position, the guide route, and the driving route determined by the infrastructure facility are transferred from the infrastructure facility to the vehicle.

The target position is the destination to be reached by the vehicle. For a case where the vehicle enters the parking lot, the target position may be a vacant parking slot in which the vehicle is to be parked within the parking lot. For a case where the vehicle leaves the parking lot, the target position may be a vacant parking slot within the pickup area of the parking lot. Alternatively, the target position may be a specific point in the vicinity of a vacant parking slot. For example, when there are several vacant parking slots that are successive in a specific area of the parking lot, the target position may be a specific point in the vicinity of the specific area having the vacant parking slots. In this case, the vehicle autonomously moves to the specific point, and an autonomous parking function of an advanced driver-assistance system (ADAS) mounted in the vehicle is activated so that the vehicle can be parked in a desired parking slot in the vicinity of the specific point. The autonomous parking function of the ADAS may be a partially automated parking system (PAPS). In this case, the efficiency of management of available parking spaces can be improved. In this case, it is not necessary for the infrastructure facility to accurately calculate the target position. That is, only rough estimation for the target position is required. Therefore, it is possible to reduce a computing resource for data processing.

The guide route is a path along which the vehicle needs to autonomously travel. The guide route is provided to the vehicle in the form of a series of instructions, such as going ahead 10 meters straight, turning right at the first corner, going ahead 20 meters straight, turning left, etc. Alternatively, the guide route is provided to the vehicle in the form of lines including straight lines and curved lines on a parking lot map. The lines indicate a driving lane from the current position to the target position on the parking lot map. Alternatively, the guide route is composed of multiple waypoints and one target position marked on a parking lot map. For example, the guide route includes three pillars A1, B2, an C3 as the multiple waypoints and a parking slot D23 as the target position. When the guide route is expressed in the form of multiple waypoints and a target position rather than straight and/or curved lines, distance information (for example, 10 m) is not required. Therefore, this guide route reduces the amount of information for V2I communication.

In step (3), a process in which the vehicle autonomously travels to reach the target position is performed. The autonomous driving of the vehicle includes traveling, stopping, and resuming of traveling. The vehicle performs autonomous driving according to commands transmitted from the infrastructure facility to the vehicle. Alternatively, the autonomous driving of the vehicle may be performed without relying on the commands from the infrastructure facility. The vehicle can autonomously travel to the target position along the guide route within the permitted driving area. During the autonomous driving of the unmanned vehicle, the vehicle is controlled to run at a preset speed or below. This preset speed may be a value transmitted from the infrastructure facility to the vehicle or may be a value stored in the vehicle. In addition, the vehicle is controlled not to deviate from an error margin of the given guide route when traveling along the guide route. This preset error may be a value transmitted from the infrastructure facility to the vehicle or may be a value stored in the vehicle. In addition, the vehicle may turn with a predetermined minimum turning radius when it is necessary to turn during the autonomous driving along the guide route. This preset minimum turning radius may be a value transmitted from the infrastructure facility to the vehicle or may be a value stored in the vehicle. The vehicle is controlled not to exceed a predetermined maximum acceleration when autonomously driving along the guide route. This preset maximum acceleration may be a value transmitted from the infrastructure facility to the vehicle or may be a value stored in the vehicle.

In step (4), a position measurement process is performed. The target of the position measurement may be a vehicle to be parked in a parking lot, an obstacle existing in the parking lot, or a vehicle that is parked in the parking lot. The infrastructure facility may measure the position of the vehicle or the obstacle and store the measured vehicle position in a database. The infrastructure facility can identify and detect vehicles or obstacles and monitors the safety of each of the plurality of vehicles in the parking lot. In addition, the infrastructure facility monitors the operation of the vehicle that is self-parking after reaching the target position and transmits a command according to the monitoring result. The vehicle can measure the position thereof. The vehicle can transmit its measured position to the infrastructure facility. The error of the position measured by the vehicle is within a predetermined error range, and the predetermined error range is determined by the infrastructure facility. The vehicle may detect obstacles present around the vehicle, measures the positions of the obstacles, and transmits the measured positions of the obstacles to the infrastructure facility. The frequency used for communication between the vehicle and the infrastructure facility is a predetermined frequency.

According to the present disclosure, the position of the vehicle can be self-measured by the vehicle. The position of the vehicle measured by the vehicle may be referred to a first vehicle position. The vehicle measures its position by communicating with an infrastructure sensor such as an access point (AP) installed in the parking lot. For example, the vehicle performs wireless communication with the AP and measures the distance to the AP on the basis of a time duration from the transmission of a wireless communication signal to the AP and the reception of the wireless communication signal from the AP. When the measurement is performed with three APs, the triangulation is used to measure the relative position of the vehicle with respect to each of the APs. Since the APs in the parking lot are part of the infrastructure facility, their positions are known in advance. That is, the absolute position of the vehicle (i.e., a first vehicle position) is determined. In some cases, the vehicle measures its position by communicating with only two APs. For example, when there is a restricted area barricaded by the wall of the parking lot, even though two candidate positions are determined through communication with the two APs, one candidate position is not an actual position because it is within the restricted area.

In addition, according to the present disclosure, the accuracy of the vehicle position (i.e., position measurement accuracy) is calculated. The accuracy of the first vehicle position means how small an error occurs between the measured first vehicle position and the actual vehicle position. To determine the accuracy of the position, the vehicle measures a distance (first distance) to a first AP from the vehicle by performing wireless communication with the first AP. In addition, the vehicle measures a distance (second distance) to a second AP from the vehicle by performing wireless communication with the second AP. In addition, a distance (third distance) between the first AP and the second AP is calculated with the Pythagorean theorem on the basis of the first distance and the second distance. Since the first AP and the second AP are part of the infrastructure facility, the actual distance (fourth distance) between the first AP and the second AP is known. Therefore, the accuracy of the first vehicle position can be calculated by comparing the measured distance (third distance) with the actual distance (fourth distance). For example, the accuracy of the first vehicle position is calculated as (third distance)/(fourth distance). When the resulting value is closer to 1, it means that the accuracy is high.

In addition, the position of the vehicle can be self-measured by the vehicle. To self-measure the vehicle position, the vehicle may use a specific image captured by a camera installed in the parking lot. To this end, the vehicle captures a specific image of an object using a built-in camera sensor, and measures a distance to the object on the basis of the actual area of the object and the measured area of the captured image. When this image-based measurement is performed on three images, the relative position of the vehicle with respect to each of the images can be measured through the triangulation method. Since the objects of the images captured in the parking lot are part of the infrastructure facility, their positions are already known. Therefore, the absolute position of the vehicle can be determined. In some cases, the vehicle can self-measure the position thereof by communicating with two APs. For example, when there is a restricted area barricaded by the wall of the parking lot, even though two candidate positions are determined on the basis of the two captured images, one candidate position may not be an actual position because it is within the restricted area.

In addition, according to the present disclosure, the accuracy of the first vehicle position is calculated. The accuracy of the first vehicle position means how small an error occurs between the measured first vehicle position and the actual vehicle position. Specifically, the vehicle measures a distance (first distance) to a first image by capturing a first image with a camera. In addition, the vehicle measures a distance (second distance) to a second image by capturing a second image with a camera. In addition, a distance (third distance) between the first image and the second image is calculated with the Pythagorean theorem on the basis the first distance and the second distance. Since the first image and the second image are part of the infrastructure facility, an actual distance (fourth distance) between the first image and the second image is known. Therefore, the accuracy of the first vehicle position can be calculated by comparing the measured distance (third distance) with the actual distance (fourth distance). For example, the accuracy of the first vehicle position is calculated as (third distance)/(fourth distance). When the resulting value is closer to 1, it means that the accuracy is high. For example, the images may be images of landmarks on the ground of the parking lot.

When the accuracy of the vehicle position measured by the vehicle is higher than the accuracy of the vehicle position measured by the infrastructure facility, the vehicle position measured by the vehicle is used as the basis for autonomous valet parking. That is, the vehicle position measured by the vehicle may be used as the basis for autonomous driving in the parking lot and autonomous parking to the target position. When the accuracy of the vehicle position measured by the vehicle is lower than a predetermined level (i.e., predetermined threshold value), the vehicle performs emergency braking to prevent an accident and then performs an error control operation.

In addition, according to the present disclosure, the vehicle position may be measured by the infrastructure facility. The position of the vehicle measured by the infrastructure facility may be referred to a second vehicle position Specifically, the infrastructure facility measures the second vehicle position by communicating with the vehicle via an AP installed in the parking lot. Specifically, each of the three APs may perform communication with the vehicle to measure the second vehicle position. In some cases, the second vehicle position measurement may be performed with only two APs in the area where the wall of the parking lot exists. Specifically, the infrastructure facility may measure the second vehicle position with the use of a camera sensor installed in the parking lot. For example, a camera, which is part of the infrastructure facility, captures an image of a region in the parking lot in which vehicles are parked. Then, the position of a specific vehicle can be identified from the captured image.

In addition, according to the present disclosure, the accuracy of the second vehicle position measured by the infrastructure facility is calculated. The accuracy of the second vehicle position measured by the infrastructure facility means how small an error occurs between the vehicle position measured by the infrastructure facility and the actual vehicle position. Specifically, the vehicle position accuracy of the infrastructure facility is determined at the time of building the infrastructure facility of the parking lot. For example, obstacles such as pillars and walls in the parking lot may reduce the accuracy of the vehicle position measurement of the infrastructure facility, which uses APs for position measurements. Therefore, in the early stage of construction of the infrastructure facility including APs and/or cameras in the parking lot, the accuracy of position measurements of the infrastructure facility is calculated in advance for each region in the parking lot and then used later when necessary. This reduces the complexity of calculation and allows only a tolerable error in the position measurement.

When the accuracy of the position measurements performed by the infrastructure facility is higher than the accuracy of the position measurements performed by the vehicle is higher, the position measured by the infrastructure facility is used for autonomous valet parking (i.e., autonomous driving in the parking lot and autonomous parking to the target position). When the accuracy of the position measurements performed by the infrastructure facility is lower than a predetermined level (i.e., predetermined threshold value), the vehicle performs emergency braking to prevent an accident and performs an error control operation.

In step (5), an autonomous parking process is performed. The autonomous parking refers to an operation in which the vehicle that has reached around the target position enters a target vacant parking slot. The vehicle performs autonomous parking by sensing obstacles or nearby vehicles that are parked by using a distance sensor mounted on the vehicle. Examples of the distance sensor mounted on the vehicle includes, for example, an ultrasonic sensor, a radar sensor, a lidar sensor, and a camera.

In step (6), an emergency braking process is performed. The emergency braking of the vehicle is performed according to commands transmitted from the infrastructure facility or may be performed by itself when the vehicle detects an obstacle. When the infrastructure facility determines that the vehicle enters an unsafe area, the infrastructure facility orders the vehicle to perform emergency braking. When the infrastructure facility determines that the surroundings of the vehicle become safe after the emergency braking is performed, the infrastructure facility orders the vehicle to resume autonomous driving or autonomous parking. When the vehicle detects an obstacle, the vehicle performs emergency braking. In addition, the vehicle reports to the infrastructure facility the emergency braking that is performed by itself or the type or location of an obstacle which is the cause of the emergency braking. The vehicle reduces its speed according to a predetermined deceleration value preset for the emergency braking. This predetermined deceleration value is a value determined by the infrastructure facility or a value stored in the vehicle. The predetermined deceleration value is determined according to the type of obstacle, the location of the obstacle, and the distance between the vehicle and the obstacle. The vehicle resumes autonomous driving or autonomous parking upon receiving a resumption command for the autonomous driving or autonomous parking from the infrastructure facility. Alternatively, the vehicle resumes autonomous driving or autonomous parking when it is assured that the obstacle around the vehicle is removed. The vehicle reports to the infrastructure facility the resumption of autonomous driving or autonomous parking and the removal of nearby obstacles.

In some forms of the present disclosure, the emergency braking is performed when the accuracy of the vehicle position measured by the vehicle is lower than a predetermined level and the accuracy of the vehicle position measured by the infrastructure is lower than the predetermined level. The autonomous driving and autonomous parking of the vehicle is performed on the basis of the position of the vehicle measured in real time. In parking lots, it is not rare that the vehicle-to-vehicle distance is 1 m or less. Therefore, if a large error occurs in the position measurement, a car collision may occur.

In step (7), a process in which the automated valet parking procedure is finished is performed. After the vehicle has completed autonomous driving and autonomous parking, the infrastructure facility issues a control release command to the vehicle. The vehicle can perform engine on/off or power on/off according to commands received from the infrastructure facility or without depending on the commands from the infrastructure facility. In addition, the vehicle can lock the vehicle door according to commands received from the infrastructure facility or without depending on the commands from the infrastructure facility. In addition, the vehicle can apply a parking brake according to commands received from the infrastructure facility or without depending on the commands from the infrastructure facility.

In step (8), an error control process is performed. The error control is performed when an error occurs in communication between the vehicle and the infrastructure facility and/or when a mechanical operation error of the vehicle occurs. The infrastructure facility detects a communication error by monitoring the communication with the vehicle. The vehicle detects a communication error by monitoring the communication with the infrastructure facility. The vehicle detects whether a mechanical operation error occurs by monitoring operating states of built-in accessories including a sensor mounted thereon. The vehicle detects the presence of a person or animal in the vehicle and applies an emergency brake when the presence of a person or animal is detected. The vehicle resumes autonomous parking or autonomous driving according to the commands received from the infrastructure facility after performing the emergency braking. Alternatively, the vehicle may determine, by itself, whether the cause of the emergency braking is removed and resumes autonomous parking or autonomous driving when the cause of the emergency parking is removed.

In some forms of the present disclosure, the error control is performed when the accuracy of the vehicle position measured by the vehicle is lower than a predetermined level and the accuracy of the vehicle position measured by the infrastructure facility is lower than the predetermined level. The autonomous driving and autonomous parking of the vehicle is performed on the basis of the vehicle position measured in real time. In parking lots, it is not rare that the vehicle-to-vehicle distance is 1 m or less. Therefore, if a large error occurs in the position measurement, a car collision may occur.

FIG. 5 is a diagram illustrating a communication process performed between the infrastructure facility for automated valet parking and a vehicle in some forms of the present disclosure.

In step (1), vehicle qualification information is transmitted from the vehicle to the infrastructure facility. The vehicle qualification information includes an identifier that can distinguish each vehicle from other vehicles. For example, the vehicle qualification information may be a unique number for identifying the vehicle. The vehicle qualification information is transmitted when the autonomous value parking procedure is initiated after the vehicle enters a parking lot (see bracketed reference numeral (1) of FIG. 4A).

In step (2), an autonomous valet parking preparation command is transmitted from the infrastructure facility to the vehicle. The autonomous valet parking preparation command is transmitted before the autonomous driving of the vehicle begins.

In step (3), vehicle information is transmitted from the vehicle to the infrastructure facility. The vehicle information includes state information and position information of the vehicle. The state information of the vehicle includes whether the vehicle is traveling, whether the vehicle is stopped, or whether the vehicle is in an emergency stop state. The vehicle information is transmitted periodically at a specific frequency of, for example, 1 Hz (i.e., once per second). The vehicle information is used as a parameter to determine whether a communication error occurs between the vehicle and the infrastructure facility. For example, when the vehicle information does not reach the infrastructure facility at a predetermined time that is estimated according to the communication frequency, the infrastructure facility determines that an error has occurred in communication between the vehicle and the infrastructure facility.

In step (4), an acknowledgement of the receive of the vehicle information is transmitted to the vehicle from the infrastructure facility. The acknowledgement of the receipt of the vehicle information is transmitted at the same frequency as the vehicle information that is transmitted in step (3). The acknowledgement of the receipt of the vehicle information is used as a parameter to determine whether an error has occurred in communication between the vehicle and the infrastructure facility. For example, when the vehicle information does not reach the infrastructure facility at a predetermined time that is estimated according to the communication frequency, the infrastructure facility determines that an error has occurred in communication between the vehicle and the infrastructure facility.

In step (5), a target position and a guide route are transmitted from the infrastructure facility to the vehicle. The delivery of the target position and the guide route may be performed either before or after an autonomous valet parking start command is transmitted from the infrastructure facility to the vehicle.

In step (6), driving-area boundary information is transmitted to the vehicle from the infrastructure facility. The driving-area boundary information includes landmarks (e.g., lines demarcating parking slots, a central line, and road boundary lines demarcating a driving lane) that mark the boundaries of a permitted driving area. The transmission of the driving-area boundary information may be performed after the autonomous valet parking preparation command is delivered. This driving-area boundary information is transmitted from the infrastructure facility to the vehicle in the form of a parking lot map.

In step (7), the autonomous valet parking start command is transmitted from the infrastructure facility to the vehicle. The transmission of the autonomous valet parking start command is performed after the guide route and the driving-area boundary information are delivered. The autonomous valet parking start command is also transmitted when the case of the emergency braking is removed.

In step (8), an emergency braking command is transmitted to the vehicle from the infrastructure facility.

In step (9), a vehicle control release command is transmitted to the vehicle from the infrastructure facility. The delivery of the vehicle control release command is performed after the vehicle is autonomously parked in the parking slot.

Figure 6:
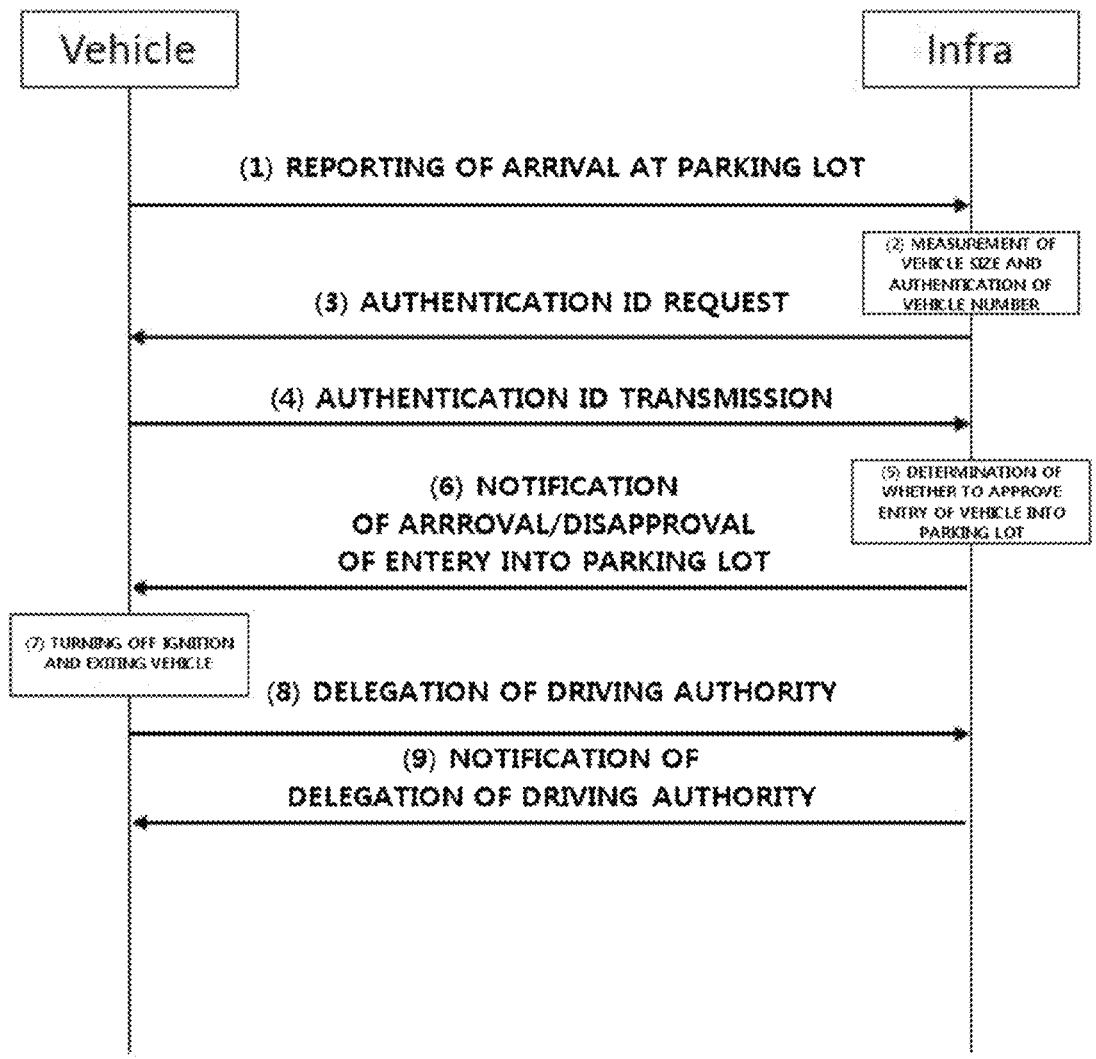
FIG. 6 is a diagram illustrating a communication process performed between an infrastructure facility for automated valet parking and a vehicle in one form of the present disclosure.

FIG. 6 is a diagram illustrating a communication process performed between the infrastructure facility 100 for automated valet parking and a vehicle 200.

In step (1), the vehicle 200 enters a parking lot and stops at a predetermined stop position. This stop position may be an entrance gate of the parking lot. The vehicle 200 reports its arrival to the infrastructure facility 100. In step (2), the infrastructure facility 100 measures the dimensions of the vehicle 200 and authenticates the vehicle 200 on the basis of an authentication ID of the vehicle 200. In step (3), the infrastructure facility 100 transmits an authentication ID submission request to the vehicle 200. In step (4), the vehicle 200 transmits the authentication ID to the infrastructure facility 100. In step (5), the infrastructure facility 100 determines whether to allow entry of the vehicle 200 into the parking lot on the basis of the received authentication ID. In step (6), the infrastructure facility 100 notifies the vehicle whether the vehicle 200 is permitted to enter the parking lot according to the authentication result of the received authentication ID. For example, the infrastructure facility 100 may display approval or disapproval on a display panel installed around the stop position. The driver of the vehicle 200 moves the vehicle 200 to a drop-off area when the entry of the parking lot is approved. In step (7), the driver turns off the engine of the vehicle 200, gets off the vehicle 200, locks the door of the vehicle 200, and leaves the drop-off area. In step (8), the authority to drive the vehicle 200 is delegated from the vehicle 200 (or the driver) to the infrastructure facility 100. In addition, in step (9), the infrastructure facility 100 notifies the driver that it takes the right to control the vehicle 200 in the parking lot. Such a notification may be sent to a driver's smart device through a mobile communication network.

Figure 7:
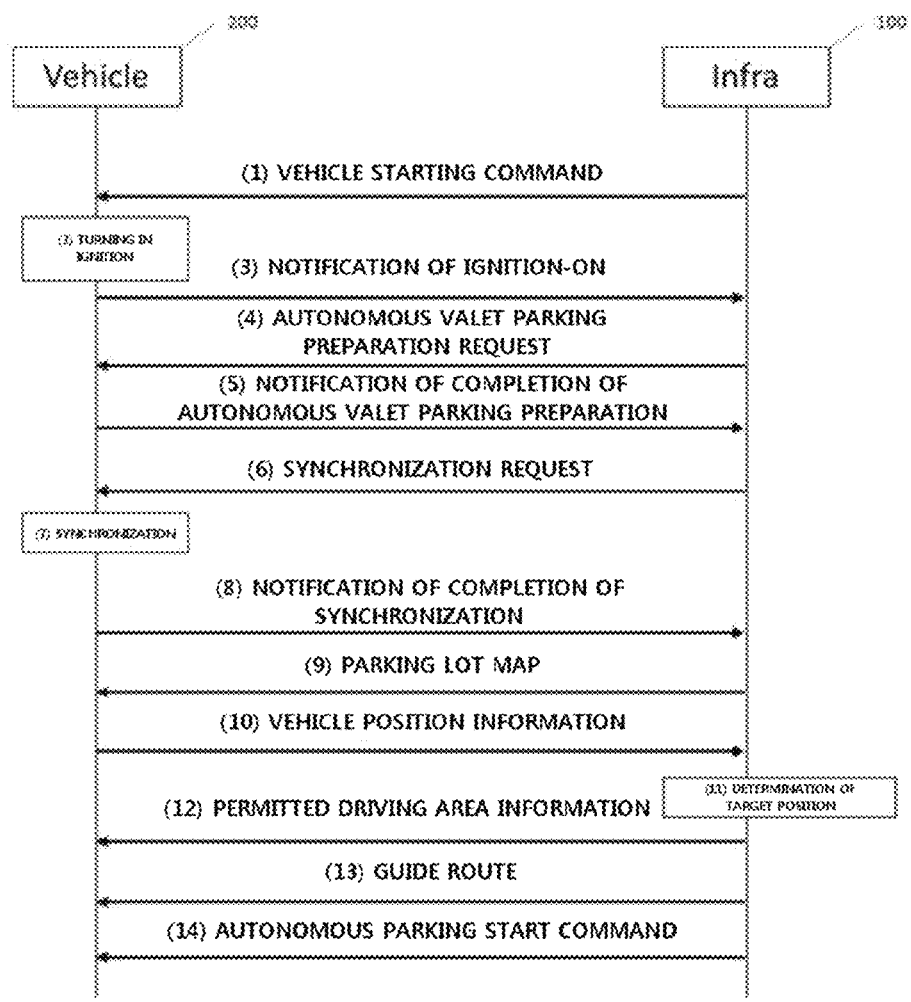
FIG. 7 is a diagram illustrating a communication process performed between an infrastructure facility for automated valet parking and a vehicle in one form of the present disclosure.

FIG. 7 is a diagram illustrating a communication process performed between the infrastructure facility 100 for automated valet parking and a vehicle 200.

In step (1), the infrastructure facility 100 sends a vehicle start request to the vehicle 200. In step (2), the vehicle 200 turns on the engine in response to the vehicle start request transmitted from the infrastructure facility 100. In step (3), the vehicle 200 transmits an acknowledgement of the receipt of the vehicle start request to the infrastructure facility 100 after turning on the engine. In step (4), the parking infrastructure facility 100 sends an automated valet parking preparation request to the vehicle 200. In step (5), the vehicle 200 transmits a reply to the automated valet parking preparation request to the infrastructure facility 100. The reply is a message of OK indicating that the preparation for automated valet parking is completed or a message of NG indicating that the preparation for automated valet parking is not completed. In step (6), the infrastructure facility 100 transmits a synchronization request to vehicle 200. The synchronization request is a request for instructing synchronization of the time such that the timer of the infrastructure facility 100 is synchronized with the timer of the vehicle 200. For example, the synchronization request includes information about time indicated by the timer of the infrastructure facility 100. In step (7), the vehicle 200 performs the synchronization according to the synchronization request. In step (8), the vehicle 200 transmits a reply indicating that the synchronization is completed to the infrastructure facility 100. For example, until the synchronization between the infrastructure facility 100 and the vehicle 200 is completed, a plurality of synchronization requests may be transmitted from the infrastructure facility 100 to the vehicle 200. In step (9), the infrastructure facility 100 transmits parking lot map information to vehicle 200. The parking lot map information includes landmark information. In step (10), the vehicle 200 estimates (or calculates) the position of the vehicle 200 on the basis of the transmitted landmark information, and the vehicle 200 transmits the estimated position of the vehicle 200 to the infrastructure facility 100. In step (11), the infrastructure facility 100 determines a target position (target parking position). In step (12), the infrastructure facility 100 transmits information on a permitted driving area to the vehicle 200. For example, the infrastructure facility 100 transmits boundary information of the permitted driving area to the vehicle 200. In step (13), the infrastructure facility 100 transmits a guide route to the vehicle 200. In step (14), the infrastructure facility 100 transmits an automated valet parking start command to the vehicle 200.

Figure 8:
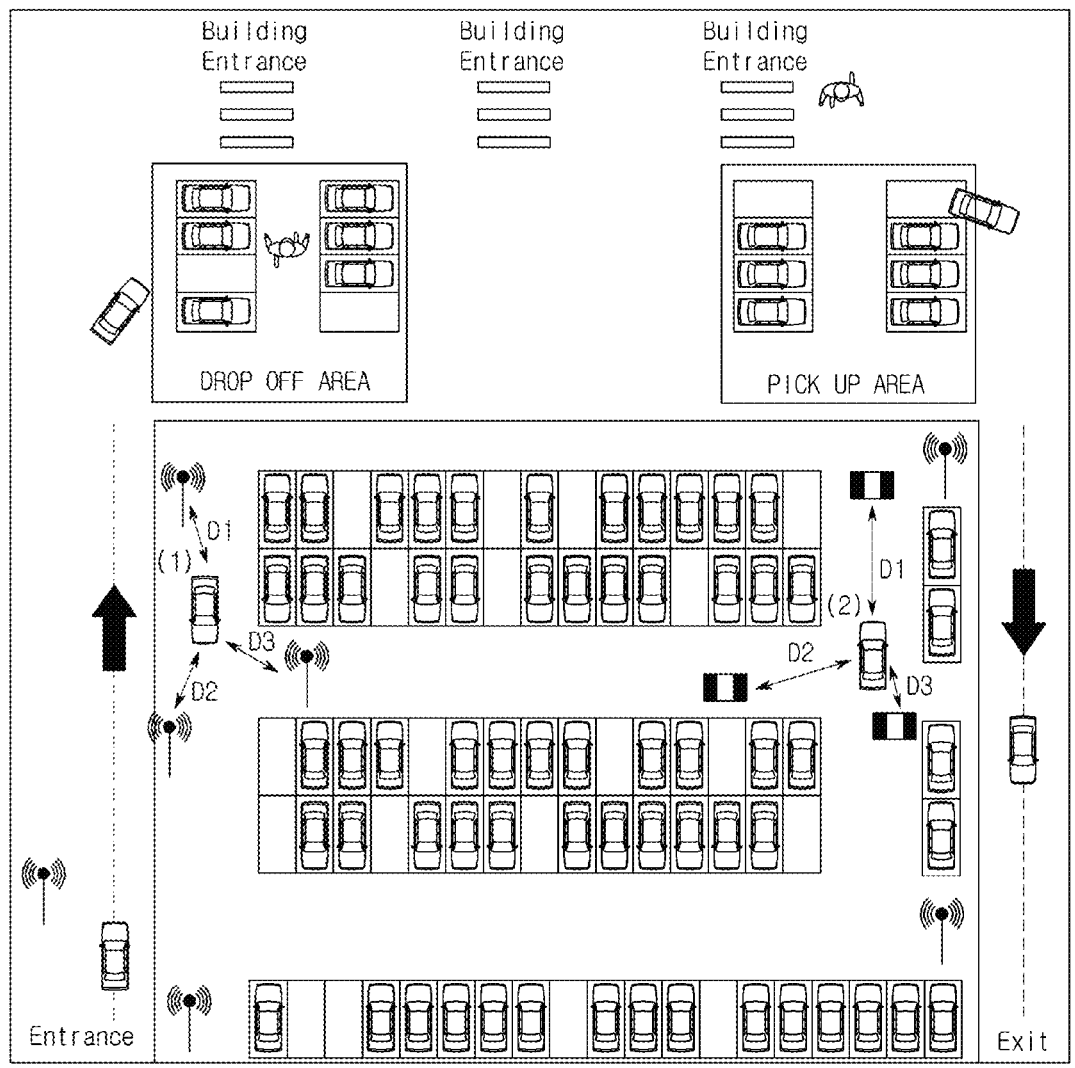
FIG. 8 is a diagram illustrating a method in which a vehicle measures its position.

FIG. 8 is a diagram illustrating a method in which a vehicle self-measures its position.

FIG. 8 illustrates a vehicle 1 that is in autonomous driving and a vehicle 2 parked in a parking lot.

The vehicle 1 performs wireless communication with three APs. As a result of the wireless communication, the distances to the respective APs are calculated. The distance from a first AP is denoted by D1, the distance from a second AP is denoted by D2, and the distance from a third AP is denoted by D3. The vehicle 1 measures its relative position with respect to each of the three APs (i.e., the first AP, the second AP, and the third AP) on the basis from the three distances D1, D2, and D3 measured as described above. That is, the vehicle 1 can measure its position using the triangulation method on the basis of the three distances. The three APs correspond to components constituting the infrastructure facility, and the absolute positions of the three APs can be calculated because the locations at which the APs are installed are known. In some cases, the vehicle measures its position by communicating with only two APs. For example, when there is a restricted area barricaded by the wall of the parking lot, even though two candidate positions are determined through communication with the two APs, one candidate position may not be an actual position because it is within the restricted area. In addition, according to the present disclosure, the accuracy of the vehicle position is calculated. The accuracy of the vehicle position means how small an error occurs between the measured vehicle position and the actual vehicle position. To determine the accuracy of the vehicle position, the vehicle measures a distance (first distance) to a first AP from the vehicle by performing wireless communication with the first AP. In addition, the vehicle measures a distance (second distance) to a second AP from the vehicle by performing wireless communication with the second AP. In addition, a distance (third distance) between the first AP and the second AP is calculated with the Pythagorean theorem on the basis of the first distance and the second distance. Since the first AP and the second AP are part of the infrastructure facility, the distance (fourth distance) between the first AP and the second AP is known. Therefore, the accuracy of the vehicle position measured by the vehicle can be calculated by comparing the measured distance (third distance) with the actual distance (fourth distance). For example, the accuracy of the vehicle position is calculated as (third distance)/(fourth distance), and a value closer to 1 means higher accuracy.

The vehicle 2 captures images of nearby landmarks using a built-in camera sensor. After the images of the landmarks are captured, the distances to the respective landmarks are calculated. The distance to a first landmark is denoted by D1, the distance to a second landmark is denoted by D2, and the distance to a third landmark is denoted by D3. The vehicle may measure its relative position with respect to each of the three landmarks on the basis from the three distances D1, D2, and D3 measured as described above. That is, the vehicle 1 can measure its position using the triangulation method on the basis of the three distances. The three landmarks correspond to components constituting the infrastructure facility, and the absolute positions of the three landmarks can be calculated because the locations of the landmarks in the parking lot are known. In some cases, the vehicle may measure its position by capturing images of only two landmarks. For example, when there is a restricted area barricaded by the wall of the parking lot, even though two candidate positions are determined on the basis of the two captured images of the landmarks, one candidate position may not be determined as the actual position when it is within the restricted area. In addition, according to the present disclosure, the accuracy of the vehicle position measured by the vehicle is calculated. The accuracy of the vehicle position measurement means how small an error occurs between the measured vehicle position and the actual vehicle position. Specifically, the vehicle measures a distance (first distance) to the first landmark by capturing an image of the first landmark. In addition, the vehicle measures a distance (second distance) to the second image by capturing an image of the second landmark. In addition, the distance (third distance) between the first landmark and the second landmark is calculated with Pythagorean theorem on the basis of the first distance and the second distance. Since the first landmark and the second landmark are part of the infrastructure facility, the actual distance (fourth distance) between the first landmark and the second landmark is known. Therefore, the accuracy of the first vehicle position can be calculated by comparing the measured distance (third distance) with the actual distance (fourth distance). For example, the accuracy of the vehicle position is calculated as (third distance)/(fourth distance), and a value closer to 1 means higher accuracy.

Figure 9:
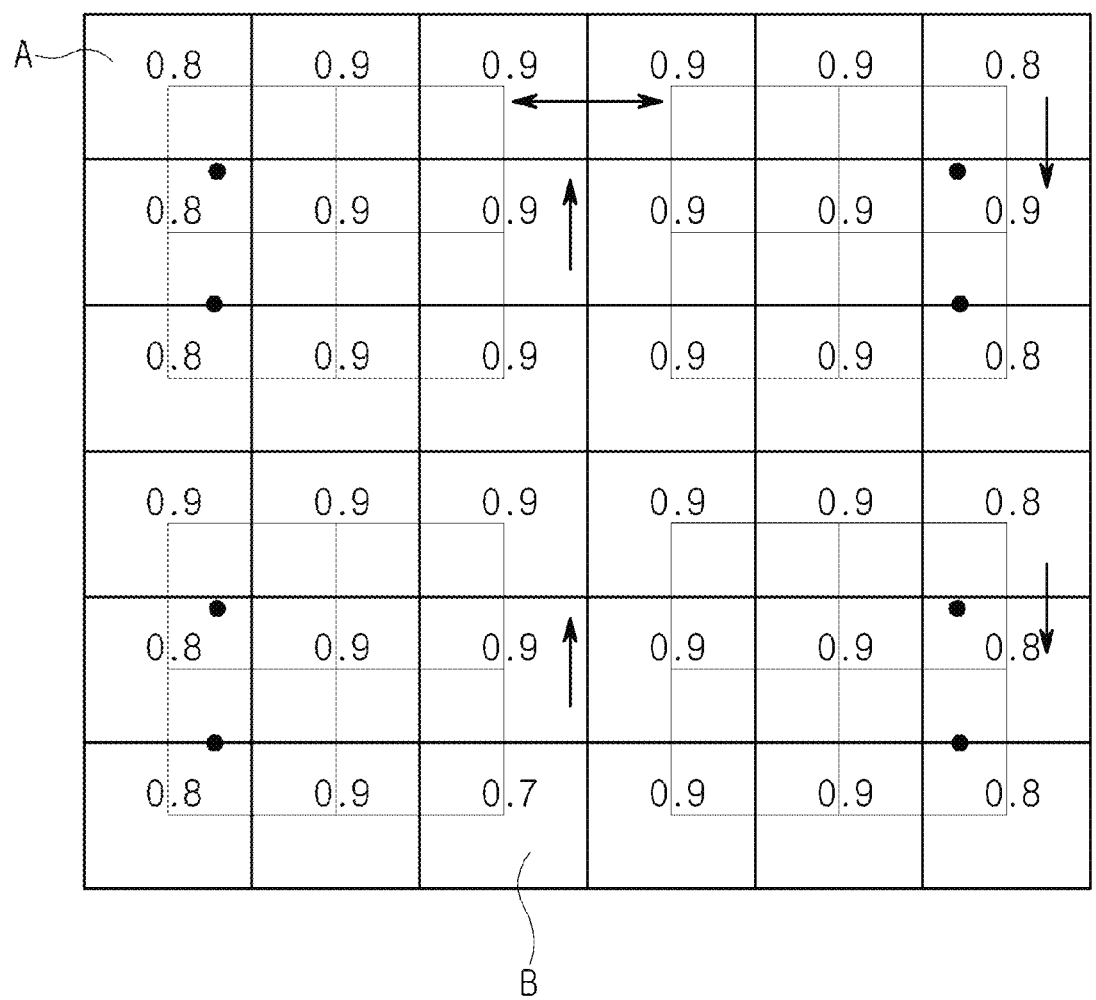
FIG. 9 is a diagram illustrating a method of calculating accuracy of a vehicle position measured by an infrastructure facility in one form of the present disclosure.

FIG. 9 is a diagram illustrating a method of calculating a position measurement accuracy of a parking infrastructure facility.

First, the infrastructure facility measures the position of a vehicle by communicating with the vehicle using three APs. This measuring method is similar to the measuring method performed by the vehicle. Specifically, the infrastructure facility measures the second vehicle position with the use of a camera sensor installed in the parking lot. For example, a camera, which is part of the infrastructure facility, captures an image of a region in the parking lot in which vehicles are parked. Then, the position of a specific vehicle can be identified from the captured image.

Thus, the accuracy of the vehicle position measured by the infrastructure facility can be calculated. The accuracy of the vehicle position measured by the infrastructure facility means how small an error occurs between the vehicle position measured by the infrastructure facility and the actual vehicle position. Specifically, the accuracy of the vehicle position measured by the infrastructure facility is determined at the time of building the infrastructure facility of the parking lot. For example, obstacles such as pillars and walls in the parking lot may reduce the accuracy of the vehicle position measured by the infrastructure facility, which uses APs for position measurements. Therefore, in the early stage of construction of the infrastructure facility including APs and/or cameras in the parking lot, the accuracy of position measurements of the infrastructure facility is calculated in advance for each region in the parking lot and then used later when necessary. This reduces the complexity of calculation and allows only a tolerable error in the position measurement. For example, the accuracy of the vehicle position measured by the infrastructure facility may be calculated to be a value of 0.8 when the vehicle is in a first parking zone A, and the accuracy of the vehicle position measured by the infrastructure facility may be calculated to be a value of 0.7 when the vehicle is in a second parking zone B.

Hereinabove, the method of calculating the position measurement accuracy of the vehicle and the position measurement accuracy of the infrastructure facility has been described with reference to FIGS. 8 and 9. According to the present disclosure, the position measurement accuracy of the vehicle and the position measurement accuracy of the infrastructure facility are compared, and a vehicle position that is measured by either the vehicle or the infrastructure facility which has a position measurement accuracy is used for automated valet parking. For example, when the position measurement accuracy of the vehicle is 0.9 and the position measurement accuracy of the infrastructure facility is 0.7, the location of the vehicle measured by the vehicle is determined as more reliable information. Therefore, it is preferable to use the position information of the vehicle measured by the vehicle for automated valet parking.

When both the position measurement accuracy of the vehicle and the position measurement accuracy of the infrastructure facility are lower than a predetermined level, emergency braking of the vehicle is performed and then error control is immediately performed.

Figure 10:
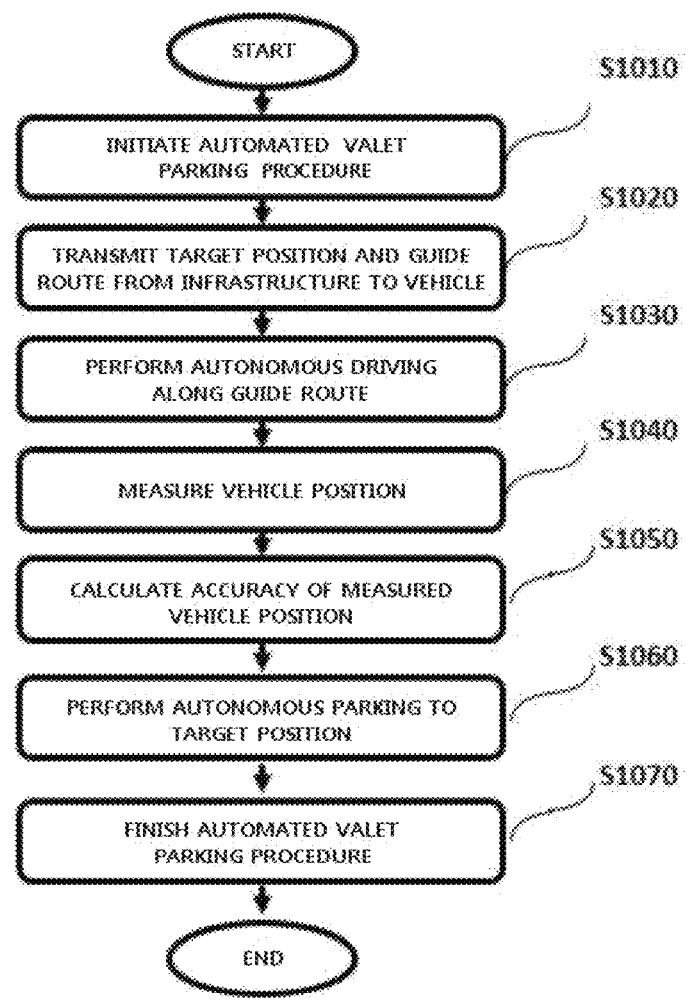
FIG. 10 is a flowchart illustrating an automated valet parking method in one form of the present disclosure.

FIG. 10 is a flowchart illustrating an automated valet parking method in some forms of the present disclosure.

In step S1010, an automated valet parking procedure is initiated. The automated valet parking procedure is initiated when a vehicle stops at a drop-off area and the driver exits the vehicle. Specifically, the infrastructure facility identifies the driver and the vehicle and determines whether the driver and the vehicle are qualified to park in the parking lot. The vehicle can turn on and off the engine thereof. The vehicle can turn on and off a power supply by itself. In addition, the vehicle can lock and unlock the vehicle doors. In addition, the authority to control the vehicle is delegated from the vehicle to the infrastructure facility. In addition, the vehicle checks whether a person or animal is present in the vehicle.

In step S1020, a target position and a guide route are transmitted to the vehicle from the infrastructure facility. The target position and the guide route are determined by the infrastructure facility, and the target position and the guide route determined by the infrastructure facility are transmitted to the vehicle. The target position is a final destination to be reached by the vehicle. The target position may be a vacant parking slot when the vehicle enters the parking lot and may be a pickup area when the vehicle leaves the parking lot. The guide route is the path along which the vehicle needs to travel to reach the target position.

In step 31030, the vehicle performs autonomous driving along the guide route. The autonomous driving of the vehicle includes traveling, stopping, and resuming of traveling. The vehicle performs autonomous driving according to commands transmitted from the infrastructure facility to the vehicle. Alternatively, the autonomous driving may be performed without relying on the commands from the infrastructure facility.

In step 31050, the position of the vehicle is measured. The target of the position measurement may be a vehicle that is in autonomous parking operation, an obstacle existing in the parking lot, or a vehicle that is parked.

In some forms of the present disclosure, the measurement of the vehicle position may be performed by the vehicle or may be performed by the infrastructure facility.

When the measurement of the vehicle position is performed by the vehicle, the vehicle may perform wireless communication with an AP installed in the parking lot. In addition, the vehicle can capture an image of a landmark installed in the parking lot with a built-in camera sensor.

When the measurement of the vehicle position is performed by the infrastructure facility, the infrastructure facility may measure the position of the vehicle by performing wireless communication with the AP installed in the parking lot. Alternatively, the infrastructure facility may measure the position of the vehicle with the use of a camera installed in the parking lot.

In step 31050, the accuracy of the vehicle position is calculated.

According to the present disclosure, the accuracy of the vehicle position measured by the vehicle is obtained by measuring the first distance between the first AP and the vehicle, measuring the second distance between the second AP and the vehicle, and calculating the distance (third distance) between the first AP and the second AP on the basis of the first and second distances. Since the actual distance (fourth distance) between the first AP and the second AP is known in advance, the accuracy of vehicle position can be obtained by comparing the third distance with the fourth distance.

In some forms of the present disclosure, the accuracy of the vehicle position measured by the vehicle is obtained by measuring the first distance between the first landmark and the vehicle, measuring the second distance between the second landmark and the vehicle, and calculating the distance (third distance) between the first landmark and the second landmark on the basis of the first and second distances. Since the actual distance (fourth distance) between the first landmark and the second landmark is known in advance, the accuracy of the vehicle position can be calculated by comparing the third distance with the fourth distance.

In addition, according to the present disclosure, the accuracy of the vehicle position of the infrastructure facility is calculated on the basis of the accuracy of the position measurement that is preset for each region within the parking lot.

In addition, the autonomous valet parking is performed on the basis of the position information measured by either the vehicle or the infrastructure facility which has a higher accuracy after the accuracy of the position measurement by the vehicle and the accuracy of the position measurement by the infrastructure facility are compared. On the other hand, when both the position measurement accuracy of the vehicle and the position measurement accuracy of the infrastructure facility are lower than a predetermined reference level, emergency braking of the vehicle is performed, and error control is immediately performed.

In step S1060, the vehicle performs autonomous driving toward the target position. The autonomous parking is performed such that the vehicle autonomously enters a vacant parking slot in the vicinity of the target position. In this case, the vehicle may detect an obstacle or a nearby parked vehicle with the use of a distance sensor mounted on the vehicle.

In addition, in step S1070, the automated valet parking procedure is finished. In some forms of the present disclosure, the described functions may be implemented in the form of hardware, software, firmware, or any combination thereof. When implemented in the form of software, these functions may be stored on or transmitted to a computer-readable medium in the form of one or more instructions or codes. The computer-readable medium refers to any medium that can transfer a computer program from one computer to another. For example, it may be a communication medium or a computer-readable storage medium. The storage medium may be an arbitrary medium that can be accessed by a computer. Computer-readable recording media include, not limitedly, RAMs, ROMs, EEPROMs, optical discs such as CD-ROM, magnetic disks, and any media that can be accessed by computers and can be used to transfer a computer program in the form of instructions from one place to another. The computer-readable media can be appropriately referred to as media that can be arbitrarily accessed by computers. For example, software can be transferred from a website, server or other remote sources through a cable or over a wireless channel. Examples of the cables include coaxial cable, fiber optic cable, twisted pair cable, and digital subscriber line (DSL), and the wireless channel uses infrared frequency waves, radio frequency waves, or ultra-high frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable media.

When some forms are implemented as program code or code segments, the code segment may represent a procedure, function, subprogram, program, routine, subroutine, module, software package, class, instructions, data structures, program command strings, or an arbitrary set of program command strings. One code segment may be connected with another code segment or a hardware circuit by transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a machine-readable medium and/or a computer-readable medium in the form of a combination or set of one or more codes and/or one or more instructions that can be integrated into a computer program product.

In the case of software implementation, the techniques described herein may be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more forms of the present disclosure. Of course, the above-described forms do not cover all possible combinations of components and/or methods to implement the present disclosure. Thus, those skilled in the art will appreciate that many further combinations and substitutions of components and/or methods in various forms are possible. Accordingly, the above-described forms cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the term "infer" or "inferencing" generally refers to a process of determining or inferring a state of a system, environment, and/or user from a set of observations of events and/or data. Inferencing can be used to identify a specific situation or action, or can generate a probability distribution of certain states, for example. Inferencing is probabilistic. That is, inferencing may mean a calculation of a probability distribution of those states, based on study on data and events. Inferencing may involve techniques used to construct a higher level event from a set of events and/or data. The inferencing refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, but not limitedly, hardware, firmware, any combination of hardware and software, software, or a computer entity associated with software being executed therein. For example, the term "component" may refer to, but not limitedly, a process running on a processor, a processor, an object, an executable thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An automated valet parking method comprising:
    initiating an automated valet parking;
    receiving a target position and a guide route from an infrastructure facility;
    performing, by a vehicle, an autonomous driving toward the target position along the guide route;
    measuring a vehicle position;
    calculating an accuracy of the measured vehicle position; and
    performing, by the vehicle, an autonomous parking to the target position,
    wherein calculating the accuracy of the measured vehicle position comprises:
        measuring a first distance between a first access point (AP) and the vehicle or a first landmark and the vehicle;
        measuring a second distance between a second AP and the vehicle or a second landmark and the vehicle;
        calculating a third distance between the first AP and the second AP or the first landmark and the second landmark based on the first distance and the second distance; and
        calculating the accuracy of the measured vehicle position based on the third distance and a fourth distance that is a predetermined distance between the first AP and the second AP or the first landmark and the second landmark.

2. The method of claim 1, wherein measuring the vehicle position comprises:
    self-measuring, by the vehicle, the vehicle position by performing a wireless communication with at least one of the first AP and the second AP installed in a parking lot.

3. The method of claim 1, wherein measuring the vehicle position comprises:
    self-measuring, by the vehicle, the vehicle position by measuring a distance to at least one of the first landmark and the second landmark installed in a parking lot using a camera sensor mounted on the vehicle.

4. The method of claim 1, wherein measuring the vehicle position comprises:
    measuring, by the infrastructure facility, the vehicle position using a camera installed in the parking lot.

5. The method of claim 4, wherein calculating the accuracy of the measured vehicle position comprises:
    calculating, by the infrastructure facility, the accuracy of the measured vehicle position based on a predetermined position measurement accuracy that is set for each of a plurality of zones in the parking lot.

6. The method of claim 1, wherein the method further comprises:
    comparing the accuracy of the vehicle position measured by the vehicle with the accuracy of the vehicle position measured by the infrastructure facility,
    determining, based on a result of comparing, one of the vehicle position measured by the vehicle and the vehicle position measured by the infrastructure facility as a position of the vehicle to be used for autonomous driving and the autonomous parking,
wherein autonomous driving and the autonomous parking are performed based on the determined position of the vehicle.

7. The method of claim 6, wherein the method further comprises:
when the accuracy of the vehicle position measured by the vehicle is higher than the accuracy of the vehicle position measured by the infrastructure facility, performing an autonomous driving of the vehicle and the autonomous parking of the vehicle based on the vehicle position measured by the vehicle; and
when the accuracy of the vehicle position measured by the vehicle is lower than the accuracy of the vehicle position measured by the infrastructure facility, performing the autonomous driving of the vehicle and the autonomous parking of the vehicle based on the vehicle position measured by the infrastructure facility.

8. The method of claim 6, wherein the method further comprises:
when the accuracy of the vehicle position measured by the vehicle is lower than a predetermined reference value and the accuracy of the vehicle position measured by the infrastructure facility is lower than the predetermined reference value, performing at least one of an emergency braking of the vehicle or an error control operation.

9. A method of operating a vehicle for an automated valet parking comprising:
initiating an automated valet parking;
receiving a target position and a guide route from an infrastructure facility;
performing an autonomous driving toward the target position along the guide route;
measuring a first vehicle position;
calculating an accuracy of the first vehicle position; and
performing an autonomous parking to the target position,
wherein the method further comprises:
receiving a second vehicle position from the infrastructure facility;
obtaining an accuracy of the second vehicle position;
comparing the accuracy of the first vehicle position measured by the vehicle with accuracy of the second vehicle position measured by the infrastructure facility; and
determining, based on a comparison result, one of the first vehicle position and the second vehicle position as a position of the vehicle to be used for the autonomous driving and the autonomous parking,
wherein the autonomous driving and the autonomous parking are performed based on the determined position of the vehicle.

10. The method of claim 9, wherein measuring the first vehicle position comprises:
measuring, by the vehicle, the first vehicle position by performing a wireless communication with an access point (AP) installed in a parking lot.

11. The method of claim 9, wherein measuring the first vehicle position comprises:
measuring a distance to a landmark installed in a parking lot using a camera sensor mounted on the vehicle.

12. The method of claim 9,
wherein the second vehicle position is measured by at least one of an access point (AP) installed in a parking lot or a camera installed in the parking lot.

13. The method of claim 9, wherein the accuracy of the second vehicle position is calculated based on a predetermined position measurement accuracy that is set for each of a plurality of zones in the parking lot.

14. The method of claim 9, wherein when the accuracy of the first vehicle position is higher than the accuracy of the second vehicle position, performing the autonomous driving and the autonomous parking based on the first vehicle position.

15. The method of claim 14, wherein the method further comprises:
when the accuracy of the first vehicle position is lower than the accuracy of the second vehicle position, performing the autonomous driving and the autonomous parking based on the second vehicle position.

16. The method of claim 15, wherein when the accuracy of the first vehicle position is lower than a predetermined reference value and the accuracy of the second vehicle position is lower than the predetermined reference value, performing at least one of an emergency braking of the vehicle or an error control operation.

17. A computer-readable recording medium having a program recorded thereon, the program to direct a processor to perform acts of:
initiating an automated valet parking;
receiving a target position and a guide route from an infrastructure facility;
performing an autonomous driving toward the target position along the guide route;
measuring a first vehicle position;
calculating an accuracy of the first vehicle position; and
performing an autonomous parking to the target position,
wherein the program to direct a processor to further perform acts of:
receiving a second vehicle position from the infrastructure facility;
obtaining an accuracy of the second vehicle position;
comparing the accuracy of the first vehicle position measured by the vehicle with accuracy of the second vehicle position measured by the infrastructure facility; and
determining, based on a comparison result, one of the first vehicle position and the second vehicle position as a position of the vehicle to be used for the autonomous driving and the autonomous parking,
wherein the autonomous driving and the autonomous parking are performed based on the determined position of the vehicle.

18. The method of claim 1, wherein calculating the accuracy of the measured vehicle position based on the third distance and a fourth distance comprises calculating the accuracy of the measured vehicle position by dividing the third distance by the fourth distance.

* * * * *